(12) United States Patent
Goyal et al.

(10) Patent No.: US 12,304,654 B2
(45) Date of Patent: May 20, 2025

(54) SYSTEMS AND METHODS FOR IDENTIFYING DAMAGE AND THEFT IN AN AIRCRAFT CARGO BAY

(71) Applicant: GOODRICH CORPORATION, Charlotte, NC (US)

(72) Inventors: Nitin Kumar Goyal, Bangalore (IN); Ashutosh Kumar Jha, Bangalore (IN); Mahesh Ainapure, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 24 days.

(21) Appl. No.: 17/850,762

(22) Filed: Jun. 27, 2022

(65) Prior Publication Data

US 2023/0306743 A1   Sep. 28, 2023

(30) Foreign Application Priority Data

Mar. 28, 2022   (IN) .............................. 202241017963

(51) Int. Cl.

| B64D 47/08 | (2006.01) |
| B64D 45/00 | (2006.01) |
| G06V 10/26 | (2022.01) |
| G06V 10/764 | (2022.01) |
| G06V 10/82 | (2022.01) |

(Continued)

(52) U.S. Cl.
CPC ............. *B64D 47/08* (2013.01); *G06V 10/26* (2022.01); *G06V 10/764* (2022.01); *G06V 10/82* (2022.01); *G06V 20/52* (2022.01); *G08B 13/00* (2013.01); *H04N 5/77* (2013.01); *H04N 7/183* (2013.01); *H04N 7/188* (2013.01); *H04N 23/695* (2023.01); *B64C 1/20* (2013.01)

(58) Field of Classification Search
None
See application file for complete search history.

(56) References Cited

U.S. PATENT DOCUMENTS

| 8,515,656 B2 | 8/2013 | Reed et al. |
| 8,570,377 B2 | 10/2013 | Hofman |

(Continued)

FOREIGN PATENT DOCUMENTS

| CN | 205921701 | 2/2017 |
| WO | 03105480 | 12/2003 |
| WO | 2011014940 | 2/2011 |

OTHER PUBLICATIONS

European Patent Office, European Search Report dated Aug. 8, 2023 in Application No. 23164399.0.

(Continued)

*Primary Examiner* — Hung Q Dang
(74) *Attorney, Agent, or Firm* — SNELL & WILMER L.L.P.

(57) ABSTRACT

A method for monitoring an aircraft cargo bay using an aircraft interface device may comprise receiving image data of a cargo bay of an aircraft. The method may further comprise detecting movement in the cargo bay, directing a camera to activate in response to that movement, and processing the captured image data. The aircraft interface device may include pre-trained neural network based algorithms configured for event classification. The method may further comprise generating an alarm based on a theft event classification and transmitting the alarm to an aircraft.

13 Claims, 9 Drawing Sheets

(51) Int. Cl.
*G06V 20/52* (2022.01)
*G08B 13/00* (2006.01)
*G08B 13/196* (2006.01)
*H04N 5/77* (2006.01)
*H04N 7/18* (2006.01)
*H04N 23/60* (2023.01)
*H04N 23/695* (2023.01)
*H04N 23/90* (2023.01)
*B64C 1/20* (2006.01)

(56) References Cited

U.S. PATENT DOCUMENTS

| | | | | |
|---|---|---|---|---|
| 9,230,250 | B1* | 1/2016 | Parker | G06Q 30/0185 |
| 10,839,506 | B1 | 11/2020 | Raghu et al. | |
| 10,854,055 | B1* | 12/2020 | Cornell | G08B 3/1016 |
| 2007/0241897 | A1* | 10/2007 | Knuepfer | B60R 25/302 |
| | | | | 348/E7.086 |
| 2010/0213313 | A1* | 8/2010 | Reed | B64D 9/00 |
| | | | | 244/118.1 |
| 2017/0372159 | A1* | 12/2017 | Schimmel | G06V 10/25 |
| 2018/0197139 | A1* | 7/2018 | Hill | H04N 25/67 |
| 2019/0256227 | A1 | 8/2019 | Balasubramanian et al. | |
| 2020/0034782 | A1* | 1/2020 | Hsieh | G06Q 30/0627 |
| 2020/0361607 | A1 | 11/2020 | Nayak et al. | |
| 2021/0124959 | A1* | 4/2021 | Kuehnle | H04N 23/611 |
| 2021/0303904 | A1 | 9/2021 | Barish | |
| 2022/0063901 | A1 | 3/2022 | Hyatt | |

OTHER PUBLICATIONS

European Patent Office, European Office Action dated Feb. 19, 2025 in Application No. 23164399.0.

* cited by examiner

SYSTEMS AND METHODS FOR IDENTIFYING DAMAGE AND THEFT IN AN AIRCRAFT CARGO BAY

CROSS-REFERENCE TO RELATED APPLICATIONS

This application claims priority to, and the benefit of, India Patent Application No. 202241017963, filed Mar. 28, 2022 (DAS Code 74BF), and titled "SYSTEMS AND METHODS FOR IDENTIFYING DAMAGE AND THEFT IN AN AIRCRAFT CARGO BAY," which is incorporated by reference herein in its entirety for all purposes.

FIELD

The present disclosure relates generally to aircraft cargo management, more specifically, identification of cargo theft and damage.

BACKGROUND

Aircraft cargo compartments are used to carry luggage and other cargo during a flight. Many cargo and passenger aircraft are equipped with semi-automatic Cargo Loading System (CLS) in the compartment. The CLS is an electrically powered system that allows Unit Load Devices (ULDs) to be carried into the aircraft cargo compartment. The primary benefit of the CLS is to reduce the manpower and loading/unloading time during shipment. ULDs and cargo pallets typically come in standardized shapes and sizes configured for bulk loading a large quantity of cargo. They also allow cargo to be efficiently loaded and fastened inside the aircraft, reducing loading time and the risk of cargo and/or aircraft damage. One of the many risks to shipping cargo via aircraft is cargo theft. For example, cargo theft crimes are believed to have increased, increasing costs for shippers and consumers alike. Moreover, improper cargo stacking, damaged cargo containers, and improper fastening of cargo have damaged aircraft fuselages, on-board cargo equipment, aircraft doors, and the like. Identifying cargo theft incidents may provide cost-benefits to shippers and consumers. Moreover, identifying cargo damage may reduce safety risks for aircraft operations and handling personnel, reduce compensation costs for lost luggage, and tend to minimize loss of reputation for airlines.

SUMMARY

A method for monitoring an aircraft cargo bay is disclosed herein. The method may comprise receiving by an aircraft interface device, image data from a camera in a cargo bay of an aircraft. In various embodiments, the method may comprise detecting, by the aircraft interface device, movement in the cargo bay. In various embodiments, the method may comprise directing, by the aircraft interface device, the camera to activate. In various embodiments, the camera may be configured to capture image data of the cargo bay.

The method may further comprise processing, by the aircraft interface device, the captured image data for event detection and event classification. In various embodiments, the method may comprise generating, by the aircraft interface device, an alarm based on a theft event classification.

In various embodiments, the detecting may further comprise comprises the aircraft interface device electrically communicating with a motion sensor. In various embodiments, the motion sensor may be configured to detect movement in the cargo bay.

In various embodiments, the method may further comprise commanding, by the aircraft interface device, the camera to adjust a view of the cargo bay. The method may further comprise interfacing, by the aircraft interface device, the aircraft interface device with on ground infrastructure. The interfacing may further comprise sending, by the aircraft interface device, the captured image data to the on ground infrastructure. In various embodiments, the on ground infrastructure may be configured to analyze the captured image data and may be further configured to process the captured image data. In various embodiments, the interfacing may further comprise receiving, by the aircraft interface device, processed image data from the on ground infrastructure, and synchronizing, by the aircraft interface device, the aircraft interface device with the on ground infrastructure.

In various embodiments, the processing may further comprise performing, by the aircraft interface device, image segmentation and representation. In various embodiments, the processing may further comprise performing, by the aircraft interface device, image extraction. In various embodiments, the processing may further comprise processing, by the aircraft interface device, the extracted image through a trained deep neural network for object classification.

A method for monitoring an aircraft cargo bay is also disclosed herein. The method may comprise receiving, by an aircraft interface device, image data from a camera in a cargo bay of an aircraft. In various embodiments, the method may comprise detecting, by the aircraft interface device, movement in the cargo bay. In various embodiments, the method may comprise directing, by the aircraft interface device, the camera to activate. In various embodiments, the camera may be configured to capture the image data of the cargo bay.

The method may further comprise processing, by the aircraft interface device, the captured image data for event detection and event classification. The method may further comprise monitoring, by the aircraft interface device, loading of cargo based on a cargo-loading event classification.

In various embodiments, the monitoring may further comprise monitoring, by the aircraft interface device, movement within the aircraft cargo bay. In various embodiments, the method may further comprise generating, by the aircraft interface device, a three-dimensional scan of the cargo bay. In various embodiments, the generating may further comprise generating, by the aircraft interface device, a three-dimensional scan of cargo containers.

In various embodiments, the method may further comprise calculating, by the aircraft interface device, an area between a fuselage wall of the cargo bay and a container based on the three-dimensional scans. The method may further comprise comparing, by the aircraft interface device, the calculated area to a minimum separation standard. In various embodiments, the method may further comprise generating, by the aircraft interface device, an alarm based on a calculated area that is less than the minimum separation standard.

A method for monitoring an aircraft cargo bay is also disclosed herein. The method may comprise receiving by an aircraft interface device, image data from a camera in a cargo bay of an aircraft. In various embodiments, the method may comprise detecting, by the aircraft interface device, movement in the cargo bay. The method may further comprise interfacing, by the aircraft interface device, the aircraft interface device with an aircraft avionics system.

In various embodiments, the method may comprise directing, by the aircraft interface device, the camera to activate. In various embodiments, the camera may be configured to record the cargo bay. In various embodiments, the camera may be configured to capture image data of the cargo bay.

The method may further comprise processing, by the aircraft interface device, the captured image data. In various embodiments, the aircraft interface device may be configured to process the image data for event detection. In various embodiments, the aircraft interface device may be configured to process the image data for enhancement. In various embodiments, the aircraft interface device may be configured to deploy pre-trained neural network based algorithms. The algorithms of the aircraft interface device may be further configured for event classification. In various embodiments, the method may comprise generating, by the aircraft interface device, an alarm based on a theft event classification. In various embodiments, the generating may comprise transmitting the alarm to an aircraft.

In various embodiments, the interfacing may further comprise interfacing, by the aircraft interface device, the aircraft interface device with the aircraft avionics system to detect phases of a flight. In various embodiments, the directing may further comprise directing, by the aircraft interface device, the camera to activate based on a phase of the flight.

In various embodiments, the interfacing may further comprise interfacing, by the aircraft interface device, the aircraft interface device with the aircraft avionics system to detect a cargo bay door status. In various embodiments, the directing may further comprise directing, by the aircraft interface device, the camera to activate based on the cargo bay door status.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

An aircraft cargo bay may contain multiple image sensors, cameras, and motion sensors placed at different locations within the cargo bay. These systems may be used to inspect the cargo bay and cargo therein. These systems may be commanded by an onboard device, such as, for example, an aircraft interface device (AID), to scan the cargo bay, capture image data, and relay the data to the AID. Image data may be, for example, images and video feeds. The AID may process the data using Machine Learning and/or Deep Learning pre-trained neural networks to identify threats and/or classify events occurring within the cargo bay. Machine Learning may be, for example, a method of data analysis that automates analytical model building. Deep Learning may be a subset of Machine Learning, comprising multiple layers of analysis.

These identified threats and events may be, for example, cargo thefts, movement within the cargo bay, risks of damage to the aircraft, and damaged cargo containers. As will be described in further detail below, the pre-trained neural networks may be trained to identify these threats. These neural networks may be trained to detect movements in the cargo bay depending on a phase of a flight, or a status of a cargo bay door. The AID may activate a camera, commanding it to begin recording the cargo bay and capturing images of the cargo bay. The AID may interface with and relay data (including images and videos) to on board video storage systems, on ground infrastructure, and avionics systems aboard the aircraft. On board infrastructure may be, for example, a cloud.

A method of monitoring the cargo bay by the AID may be used to detect tampering, detect authorized and unauthorized access to the cargo area, count people entering and exiting the cargo bay, detect the presence of humans and unexpected items in the cargo bay through thermal imaging, continuously monitor cargo for theft identification, and generate alarms in the event of unauthorized personnel entering the cargo bay or damage to the cargo bay. Accordingly, the method may reduce the need for manual inspection of the cargo bay and/or eliminate the need for constant human monitoring of long-duration video feeds of the cargo bay.

Figure 1:
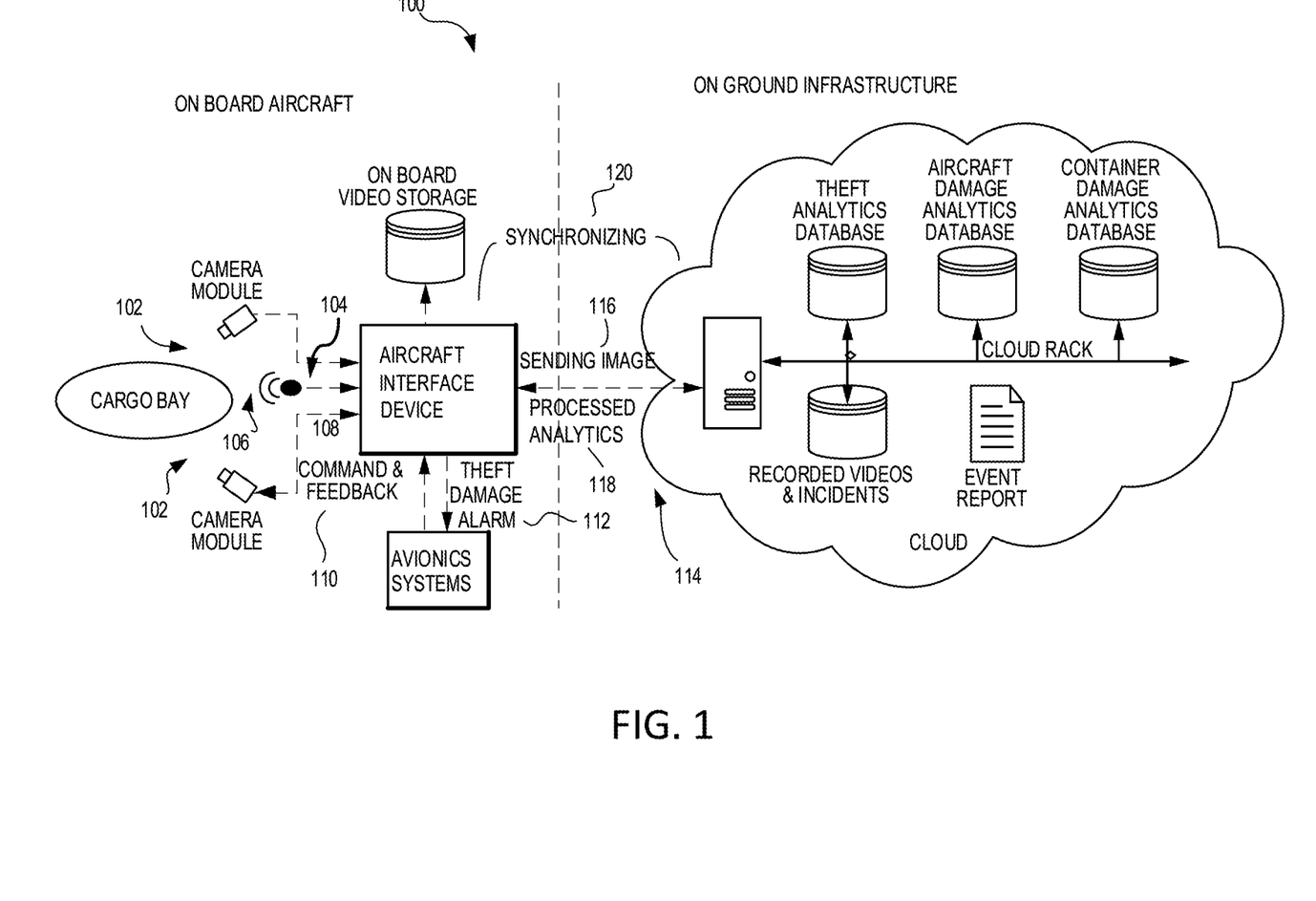
FIG. 1 illustrates a method for monitoring an aircraft cargo bay, in accordance with various embodiments.
Figure 2:
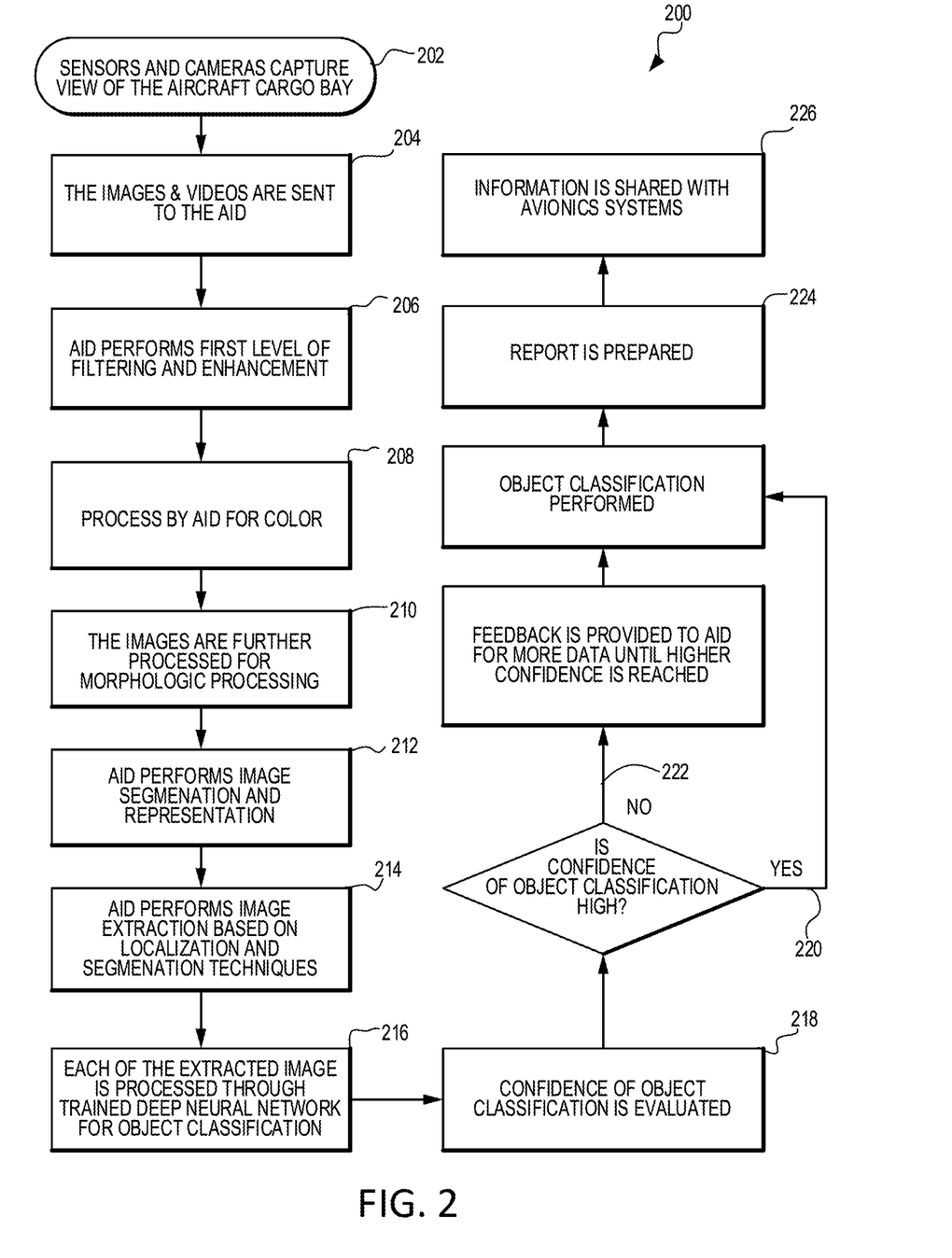
FIG. 2 illustrates a method for monitoring cargo movement in an aircraft cargo bay, in accordance with various embodiments.

Referring to FIGS. 1 and 2, a method for monitoring 100 an aircraft cargo bay is shown. As shown in FIG. 1, the method may comprise receiving (step 102), by an aircraft interface device (AID), image data from a camera of a cargo bay of an aircraft. In various embodiments, the method may comprise the AID electrically communicating (step 104) with one or more motion sensors. Motion sensors may be disposed anywhere in the cargo bay. For example, motion sensors may be disposed proximate cargo in the cargo bay.

The method may further comprise detecting (step 106), by the aircraft interface device, movement in the cargo bay. The AID may be configured to command the motion sensors to detect particular movements within the cargo bay. For example, the motion sensors may detect loading and unloading of cargo, human movement, and the like. In response to movement detection, the method may comprise directing (step 108), by the AID, the camera to activate. In various embodiments, the method may comprise commanding (step 110), by the AID, the camera to adjust a view of the cargo bay. In various embodiments, the cameras may be coupled to the motion sensors throughout the cargo bay. The cameras may be installed at or near aircraft cargo doors. In various embodiments, the cameras may provide a clear view of the entire aircraft cargo bay, covering various angles of the cargo bay. In various embodiments, the sensors and cameras may be configured to capture (step 102) views of the aircraft cargo bay in the form of videos and images.

Referring to FIG. 2, in various embodiments, the method may further comprise processing (step 200), by the AID, the captured image data. The processing step may comprise the AID in electrical communication with the cameras and sensors, wherein the camera, sensors, and AID are in a continuous command and feedback loop to capture view(s) of the aircraft cargo bay (step 202). The image data may be sent (step 204) to the AID from the cameras. In various embodiments, the AID may be configured to process the image data for event detection. In various embodiments, the AID may be configured to process the image data for enhancement and may command the cameras to do the same. In various embodiments, the AID may perform the first level of filtering and enhancement (step 206).

The processing step may further comprise the AID scanning the image data for image color (step 208). In various embodiments, the image data may be further processed for morphologic processing (step 210), relating the image data to specific objects. The processing step may further comprise AID performing image segmentation and representation (step 212). Furthermore, AID may perform image extraction based on localization and segmentation techniques (step 214).

In various embodiments, the AID may be configured to deploy pre-trained neural network based algorithms. The AID's algorithms may be further configured for event classification and movement detection. Each extracted image may be further processed through the trained deep neural network for object and/or movement classification (step 216). This trained deep neural network may evaluate a confidence of object classification (step 218). If the confidence is high, then the AID may perform the object classification (step 220). If the confidence is not high, then feedback may be provided within AID to acquire more images, videos, and/or scans of the objects and movements at issue until a higher confidence is reached (step 222). In various embodiments, AID may prepare a report (step 224) and share the report with an avionics system (step 226). In various embodiments, the AID may be configured to relay the images and recordings to an on board video storage system. Referring back to FIG. 1, in various embodiments, the method of may further comprise generating (step 112), by the AID, an alarm based on a theft event classification. In various embodiments, the generating (step 112) may comprise transmitting the alarm to an aircraft.

The feedback loop between the AID, cameras, and sensors may enable the AID to detect both normal and unusual events. In various embodiments, the camera itself may be configured to detect unusual events. As shown in feedback loop 300 in FIG. 3, and with continued reference to FIGS. 1 and 2, unusual events may be, for example, suspicious movements 302 of personnel near cargo containers, the presence of specialized tools configured to break locks or boxes, movement of cargo boxes when the boxes should be stationary and locked, lights turned on or off, smoke, fire, or flames in the cargo bay, bag tampering gestures, and the like. Upon detecting unusual events, it may be advantageous for the AID to command the camera to further enhance the image data using edge computing capabilities. The camera edge computing capabilities may reduce the amount of image data in the feedback loop between the AID and camera.

Figure 3:
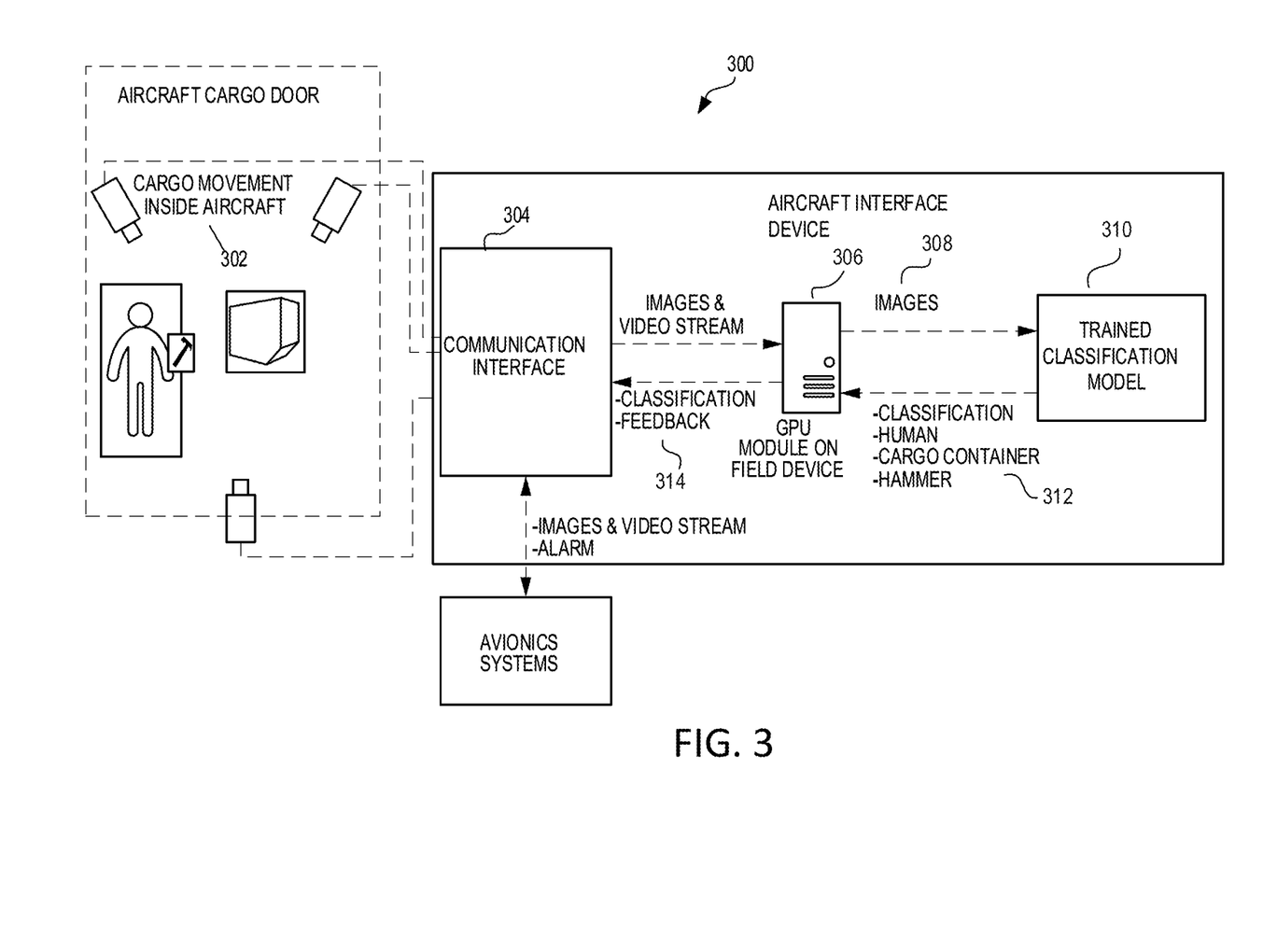
FIG. 3 illustrates a method of monitoring movement in an aircraft cargo bay, in accordance with various embodiments.

In various embodiments, and as shown in FIG. 3, a communication interface 304 of the AID may relay the image data to a graphics processing unit (GPU) module 306. The GPU 306 may then send the image data 308 to a trained classification model 310 of the AID. The trained classification model 310 may feed back one or more classifications 312 to the GPU 306, which may, in turn, feed the classifications 314 to the communication interface. These classifications 314 may be associated with unusual events, such as theft, or normal events.

Figure 4:
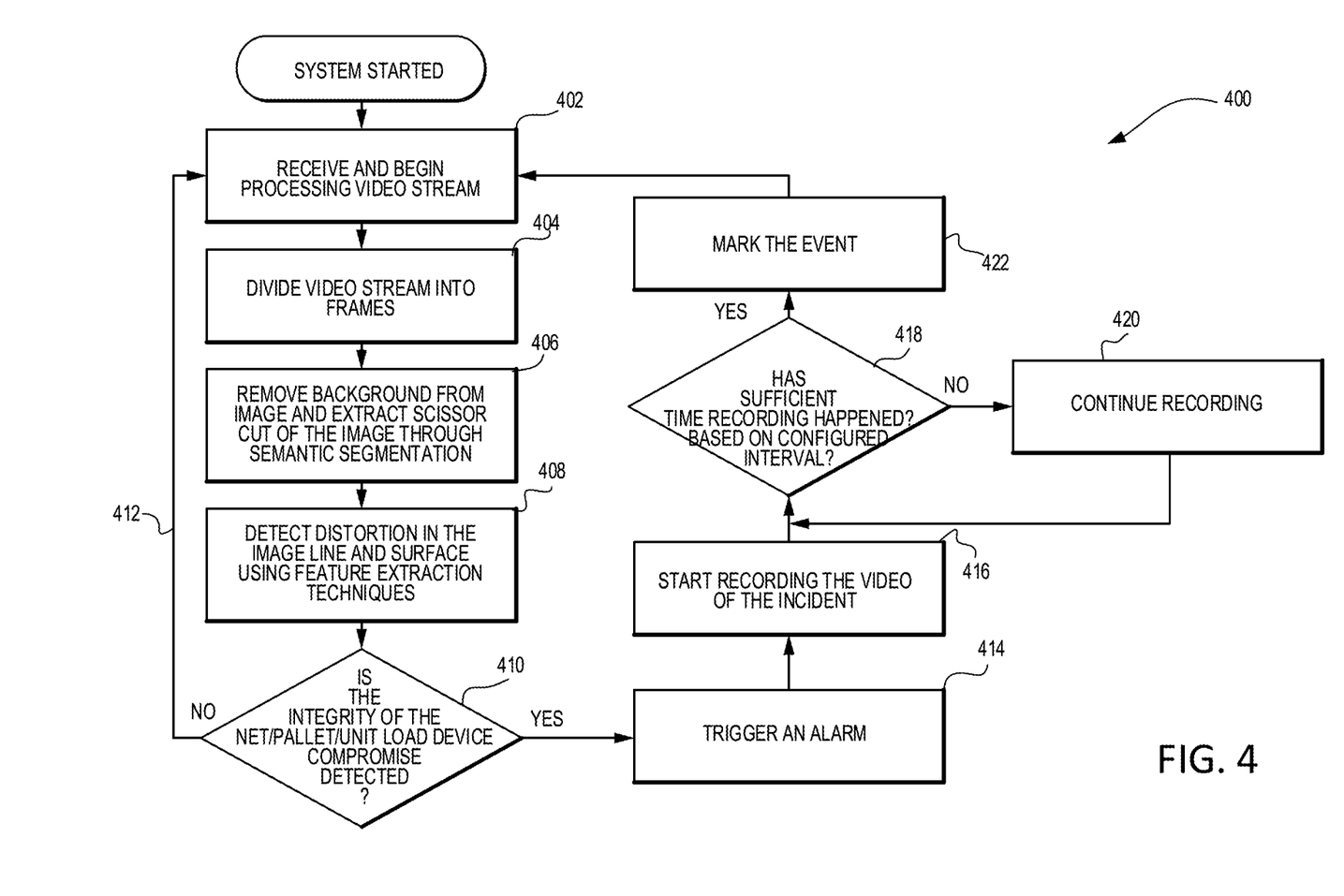
FIG. 4 illustrates a method of detecting, processing, and recording an event in an aircraft cargo bay, in accordance with various embodiments.

For example, a method (step 400) for detecting a theft and tampering event is shown in FIG. 4. In various embodiments, the AID may receive (step 402) a video stream and begin processing the stream. For instance, the AID may divide (step 404) the video stream into frames. The AID may remove background (step 406) from captured images and extract a scissor cut of an image through semantic segmentation. The AID may detect (step 408) distortion in the image line and surface using feature extraction techniques. In various embodiments, the AID may then detect (step 410) whether the integrity of aircraft cargo is compromised (i.e. tampering). If not, the AID may revert (step 412) to receiving video streams.

If tampering is detected, the AID may trigger (step 414) an alarm. The AID may also command the cameras to start recording (step 416) and continuously record the ongoing tampering incident. In various embodiments, in the absence of human intervention, the AID may determine (step 418) whether sufficient time recording has occurred based on a pre-configured time interval. If not, the AID may command (step 420) the camera to continue recording and monitoring the tampering incident. If sufficient recording data has been obtained, the AID may mark (step 422) the recording as an event. This marked recording may be further relayed to and analyzed by personnel and the appropriate authorities.

Figure 5:
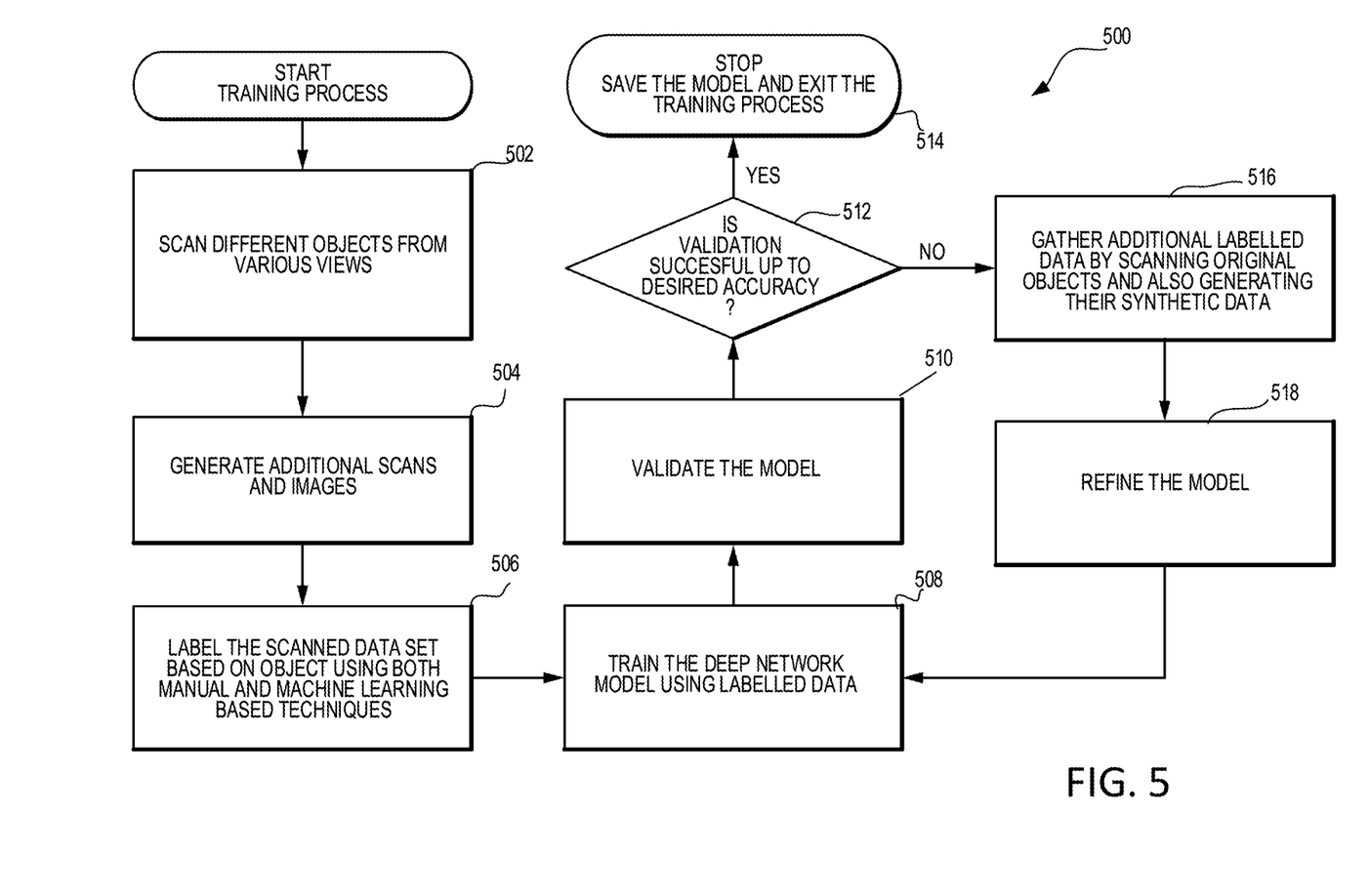
FIG. 5 illustrates a method of training an aircraft interface device to monitor cargo movement in an aircraft cargo bay, in accordance with various embodiments.

As shown in FIG. 5, a model for the AID to classify unusual events, movements, and objects may be trained (step 500) and refined. The neural networks may be trained in advance under laboratory conditions using forward and backward propagation techniques to establish a relationship between images of objects and the live scanned images coming from the AID. These objects may be, for example, humans, tools, cargo, Unit Load Devices (ULDs), cargo pallets, aircraft doors, cargo rollers, aircraft fuselages, and the like. The objects may be scanned (step 502) from a variety of angles and views. The scanned images of the objects may also be supplemented by synthetically generating (step 504) images using computers, which may be fed into the model. The scanned data may be labeled (step 506) into data sets based on the object using both manual and machine learning based techniques.

In various embodiments, the model may embody principles of fitting in special and temporal dependencies to perform object classification (human, cargo, aircraft door, tools, etc.) Accordingly, the model may be trained (step 508) using labelled data. In various embodiments, the model may be validated (step 510) and considered (step 512) for a desired accuracy. In the desired accuracy is reached, the training process may cease and the model saved (step 514). If the desired accuracy is not reached, additional labelled data may be gathered (step 516) by scanning the original objects and generating additional synthetic data. The model may then be refined (step 518), retrained, and validated to the desired accuracy. The model may then be deployed in across the AID, camera, and other on board and on ground infrastructures.

In continued reference to FIG. 1, the method may comprise interfacing (step 114), by the AID, the AID with on ground infrastructure. In various embodiments, the on ground infrastructure may be, for example, a cloud. This step may occur prior to, in conjunction with, or after the processing step (step 200). The interfacing (step 114) may further comprise sending (step 116), by the AID, captured image data to the on ground infrastructure. The on ground infrastructure may be configured to analyze the captured image data based on prefilled data using machine learning algorithms. The on ground infrastructure may be further configured to process the captured image data. The on ground infrastructure may take on the AID's aforementioned processing capabilities, or it may reinforce those capabilities. Accordingly, the on ground infrastructure may enable offloading the computing and storage requirements of on board monitoring systems. In various embodiments, the AID and on ground infrastructure may communicate via an AID-On Ground interface, wherein the AID may send captured data to the on ground infrastructure and may receive processed image data from the on ground infrastructure. Accordingly, the on ground infrastructure may convert unstructured data into structured date for storage, deeper analysis, insights delivery, and metadata extraction.

In various embodiments, the interfacing (step 114) may comprise receiving (step 118), by the AID, a processed analytics output from the on ground infrastructure. In various embodiments, the method may further comprise synchronizing (step 120), by the AID, the AID with the on ground infrastructure. The on ground infrastructure may provide network adaptations and assist the AID in the event of resource losses, such as malfunctioning or obstructed cameras. In various embodiments, the on ground infrastructure may contain software logic to stitch together the videos captured by different cameras. The on ground infrastructure may reconcile the various views of the cargo bay and generate a complete context of the cargo bay scene under observation. The on ground infrastructure may comprise high performance computing capabilities and parallel computing enabled to host and run video processing algorithms, video quality enhancers, deep learning and machine learning neural network modules, storage, and a host of event classification datasets. In various embodiments, the method may comprise synchronizing, by the AID, the AID with the on ground infrastructure for at least one of updated neural network modules and algorithm upgrades.

Figure 6:
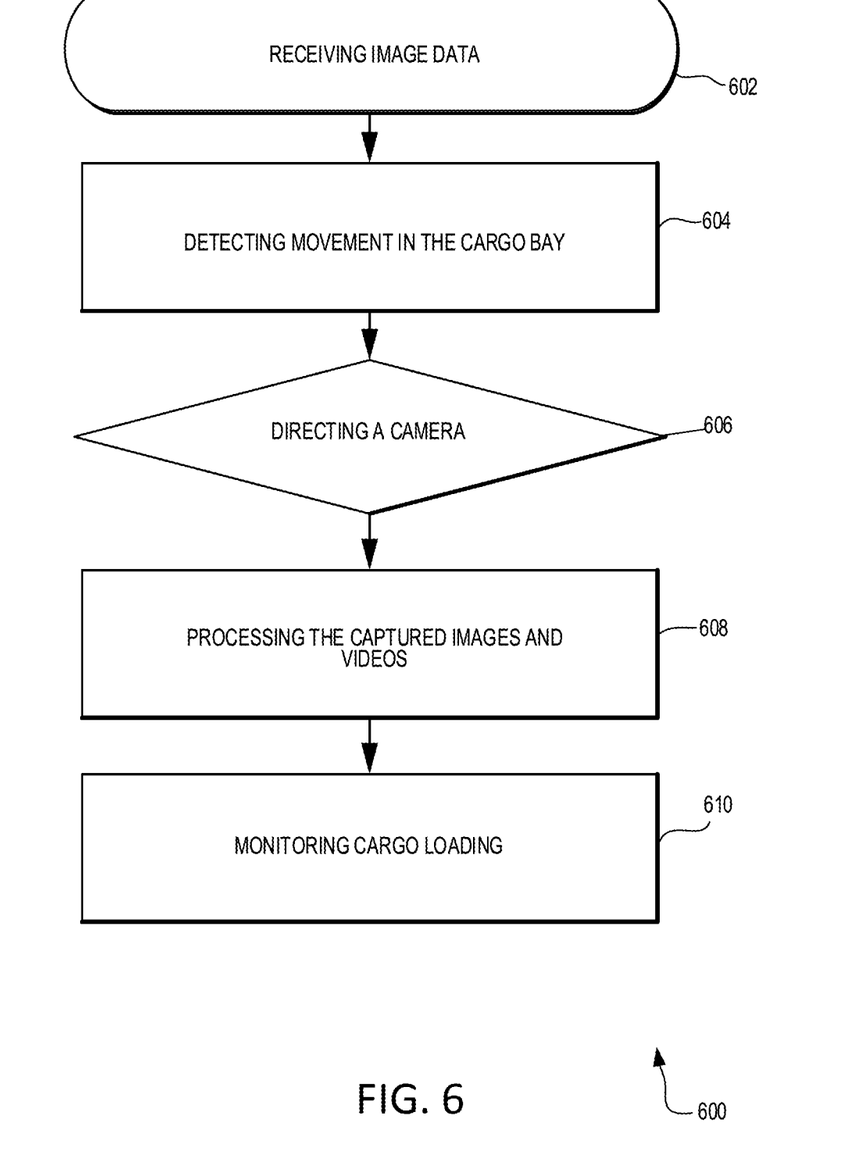
FIG. 6 illustrates a method of monitoring cargo loading in an aircraft cargo bay, in accordance with various embodiments.

Referring to FIG. 6, a method for monitoring an aircraft cargo bay is shown. Specifically, a method 600 for monitoring, by an AID, loading of cargo based on a cargo-loading event classification is shown. The method 600 may comprise receiving (step 602), by the AID, image data from a camera in a cargo bay of an aircraft. In various embodiments, the method may comprise detecting (step 604), by the AID, movement in the cargo bay. In various embodiments, the method may comprise directing (step 606), by the AID, the camera to activate. In various embodiments, the camera may be configured to record the cargo bay. In various embodiments, the camera may be configured to capture image data.

The method 600 may further comprise processing (step 608), by the AID, the captured image data. In various embodiments, the AID may be configured to process the image data for event detection. In various embodiments, the AID may be configured to process the image data for enhancement. In various embodiments, the AID may be configured to deploy pre-trained neural network based algorithms. The algorithms of the AID may be further configured for event classification. The method may further comprise monitoring (step 610), by the AID, loading of cargo based on a cargo-loading event classification.

Figure 7:
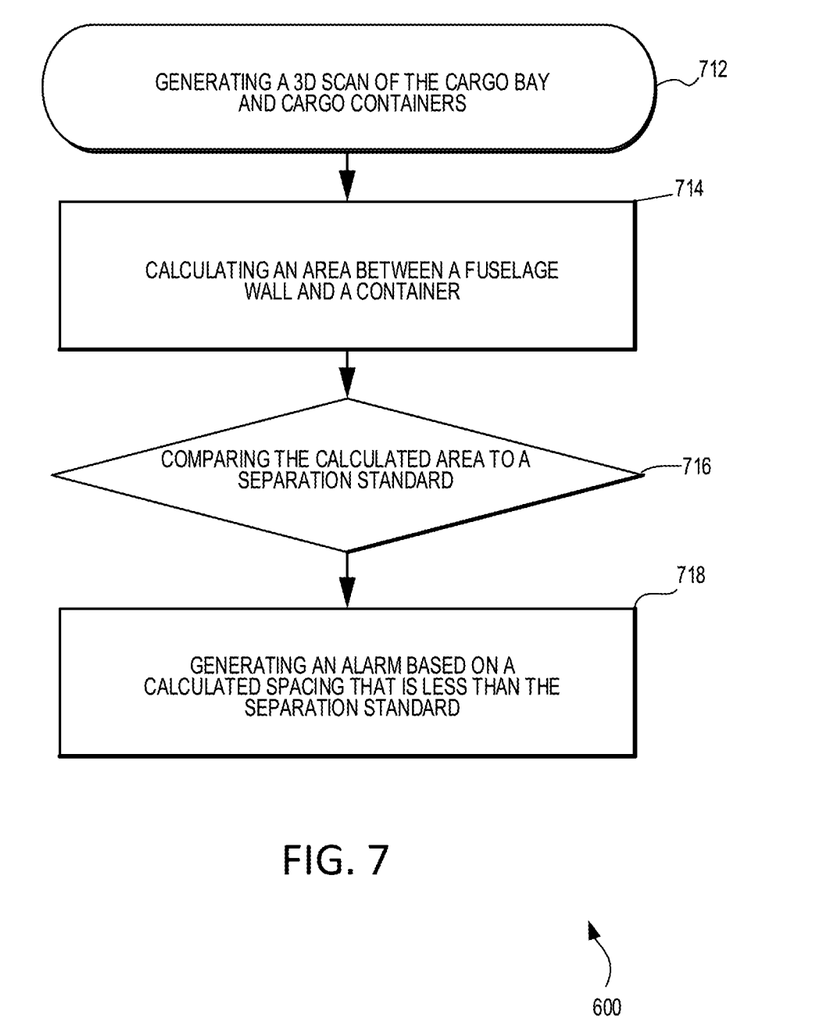
FIG. 7 illustrates a method of scanning a cargo bay and calculating spacing between cargo and the cargo bay walls, in accordance with various embodiments.

As shown in FIG. 7, in various embodiments, the method 600 for monitoring may further comprise generating (step 712), by the AID, a three-dimensional scan of the cargo bay. The generating (step 721) may occur as the AID receives (step 602) image data from the camera, before the AID receives the image data, or after the AID receives the image data. In various embodiments, the generating (step 712) may further comprise generating, by the AID, a three-dimensional scan of cargo containers.

In various embodiments, the method 600 may further comprise calculating (step 714), by the AID, an area between a fuselage wall of the cargo bay and a container based on the three-dimensional scans. The method 600 may further comprise comparing (step 716), by the AID, the calculated area to a minimum separation standard. The calculating (step 714) and comparing (step 716) may occur as the AID processes (step 608) the captured image data and scans. In various embodiments, the minimum separation standard may be a predetermined standard configured to prevent damage to fuselage walls from cargo. A minimum separation standard may be configured to prevent damage to cargo. The minimum separation standard may be specific to each aircraft line or model. Furthermore, the AID may contain these configurable parameters in software memory. In various embodiments, the method 600 may further comprise generating (step 718), by the AID, an alarm based on a calculated spacing that is less than the minimum separation standard. In various embodiments, the generating (step 718) may comprise transmitting the alarm to an aircraft. The generating (step 718) may occur during or after processing (step 608).

Figure 8:
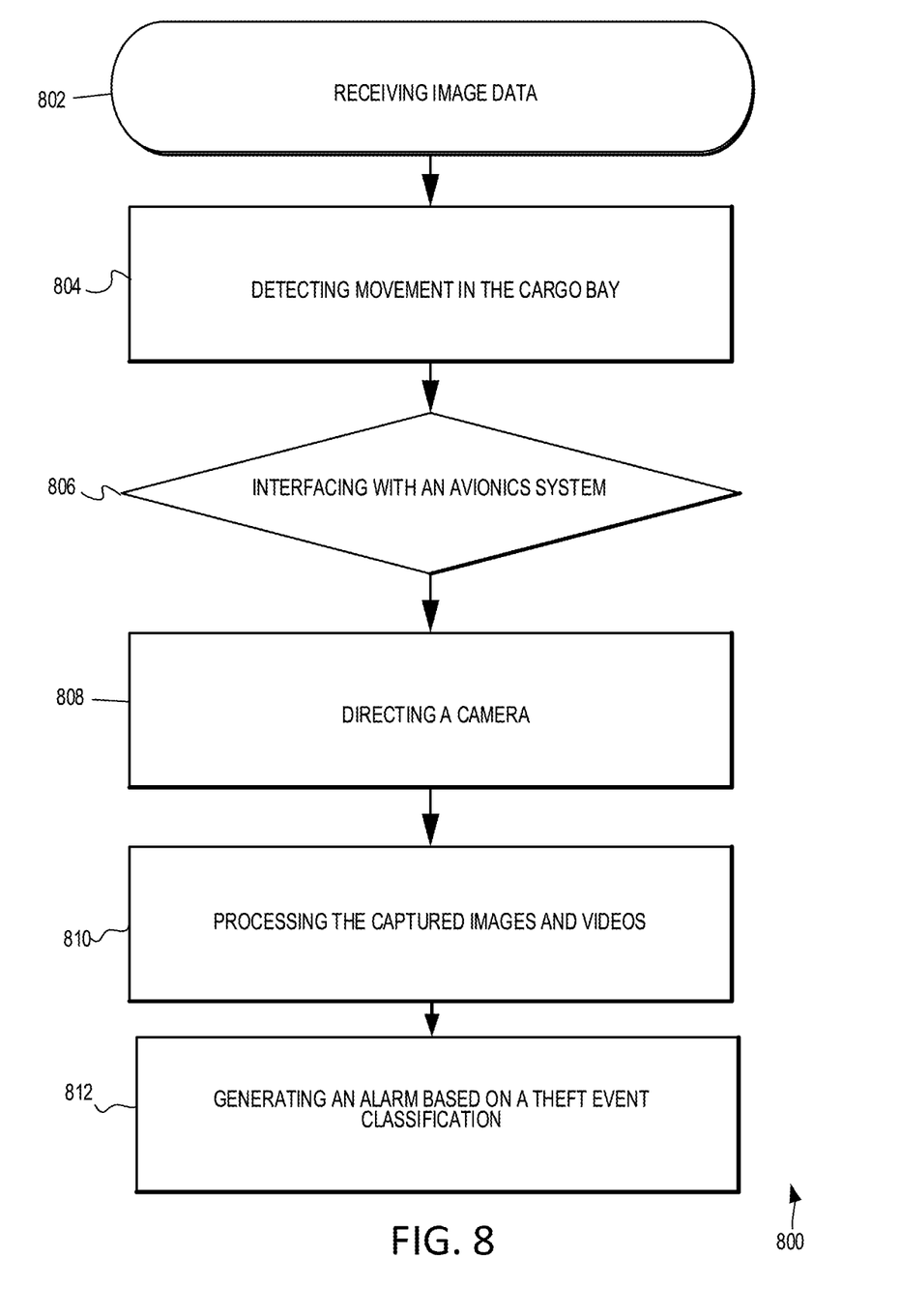
FIG. 8 illustrates a method for monitoring an aircraft cargo bay in conjunction with an avionics system, in accordance with various embodiments.

With reference to FIG. 8, a method 800 for monitoring an aircraft cargo bay is shown. The method 800 may comprise receiving (step 802), by the AID, image data from a camera in a cargo bay of an aircraft. In various embodiments, the method 800 may comprise detecting (step 804), by the AID, movement in the cargo bay. In various embodiments, the method 800 may comprise interfacing (step 806), by the AID, the AID with an aircraft avionics system. In various embodiments, the method 800 may comprise directing (step 808), by the AID, the camera to activate. In various embodiments, the camera may be configured to record the cargo bay. In various embodiments, the camera may be configured to capture image data.

The method 800 may further comprise processing (step 810), by the AID, the captured image data. In various embodiments, the AID may be configured to process the image data for event detection. In various embodiments, the AID may be configured to process the image data for enhancement. In various embodiments, the AID may be configured to deploy pre-trained neural network based algorithms. The algorithms of the AID may be further configured for event classification. The method 800 may further comprise generating (step 812), by the AID, an alarm based on a theft event classification. In various embodiments, the generating (step 812) may comprise transmitting the alarm to an aircraft.

Figure 9:
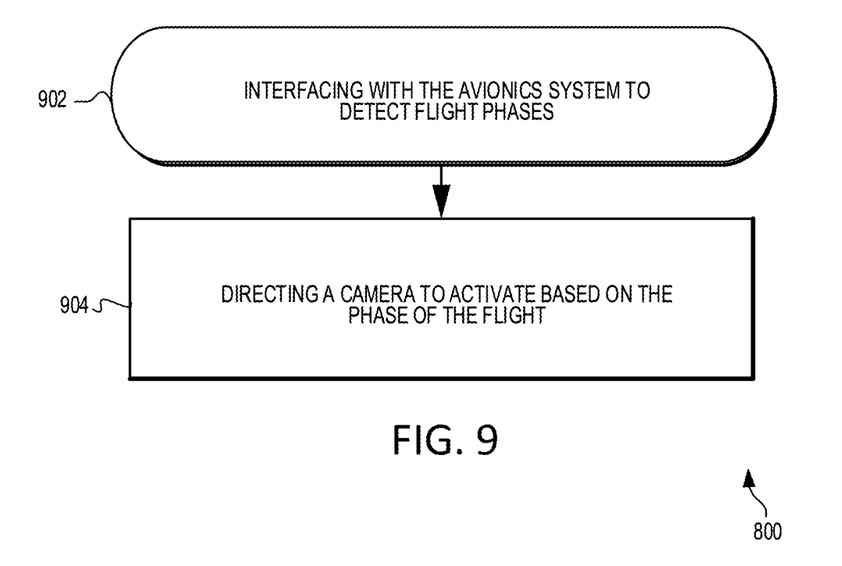
FIG. 9 illustrates a method of monitoring an aircraft cargo bay based on a phase of a flight, in accordance with various embodiments.

As shown in FIG. 9, the method 800 may further comprise interfacing (step 902), by the AID, the AID with the aircraft avionics system to detect phases of a flight. The AID may interface (step 902) with the aircraft avionics system throughout monitoring 800. In various embodiments, the AID may interface (step 902) with the aircraft avionics system as the captured image data is being processed (step 810). In various embodiments, the directing step (step 808) may further comprise directing (step 904), by the AID, the camera to activate based on a phase of the flight.

Figure 10:
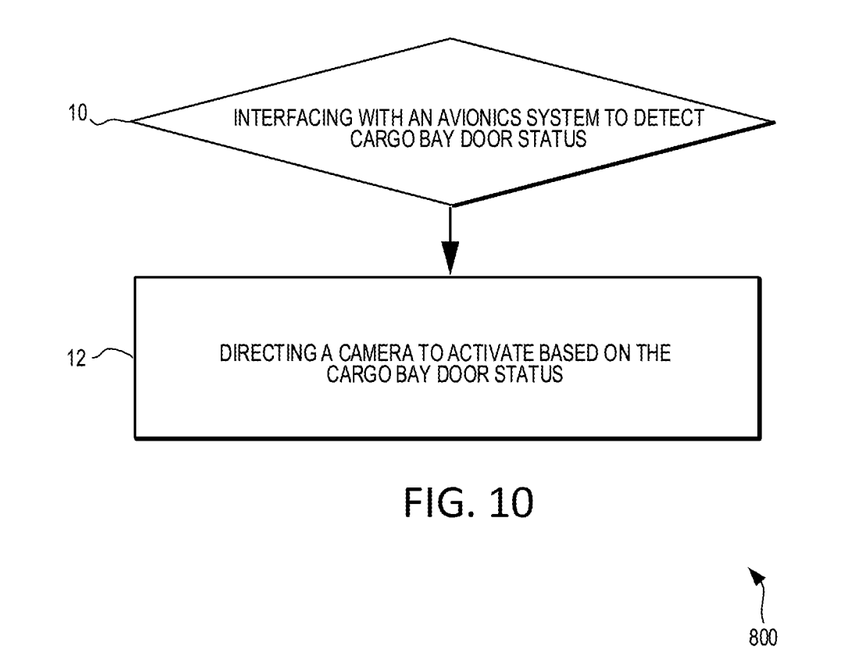
FIG. 10 illustrates a method of monitoring an aircraft cargo bay based on a cargo bay door status, in accordance with various embodiments.

As shown in FIG. 10, the method 800 may further comprise interfacing (step 10) by the AID, the AID with the aircraft avionics system to detect a cargo bay status. The AID may interface (step 10) with the aircraft avionics system throughout monitoring 800. In various embodiments, the AID may interface (step 10) with the aircraft avionics system as the captured image data is being processed (step 810). In various embodiments, the directing (step 808) may further comprise directing (step 12), by the AID, the camera to activate based on the cargo bay door status. The camera may be configured to deactivate based on a cargo bay door status indicating that the cargo bay doors are closed. In various embodiments, the camera may be configured to enter an idle setting (i.e., sleep mode) based on a cargo bay door status indicating that the cargo bay doors are closed.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method for monitoring an aircraft cargo bay, comprising:
   receiving, by an aircraft interface device, image data from a camera in a cargo bay of an aircraft;
   detecting, by the aircraft interface device, movement in the cargo bay;
   directing, by the aircraft interface device, the camera to activate, wherein the camera is configured to capture the image data of the cargo bay;
   processing, by the aircraft interface device, the captured image data for event detection and event classification, including:
      performing, by the aircraft interface device, image segmentation and representation;
      performing, by the aircraft interface device, image extraction based on localization and segmentation techniques to generate an extracted image from the captured image data;
      processing, by the aircraft interface device, the extracted image through a trained deep neural network for an object classification;
      evaluating, by the aircraft interface device, a confidence of the object classification; and
      receiving, by the aircraft interface device, feedback including additional images, videos, and/or scans in response to the confidence being low;
   generating, by the aircraft interface device, an alarm based on a theft event classification;
   commanding, by the aircraft interface device, the camera to record video based on the theft event classification; and
   marking, by the aircraft interface device, the recording as an event in response to determining that a pre-configured time interval has passed since recording began.

2. The method of claim 1, wherein the detecting further comprises the aircraft interface device electrically communicating with a motion sensor.

3. The method of claim 2, wherein the motion sensor is configured to detect movement in the cargo bay.

4. The method of claim 1, further comprising:
   commanding, by the aircraft interface device, the camera to adjust a view of the cargo bay.

5. The method of claim 1, further comprising:
interfacing, by the aircraft interface device, the aircraft interface device with on ground infrastructure.

6. The method of claim 5, wherein the interfacing further comprises sending, by the aircraft interface device, the captured image data to the on ground infrastructure, wherein the on ground infrastructure is configured to analyze the captured image data and is further configured to process the captured image data.

7. The method of claim 6, wherein the interfacing further comprises receiving,
by the aircraft interface device, processed image data from the on ground infrastructure, and synchronizing, by the aircraft interface device, the aircraft interface device with the on ground infrastructure.

8. The method of claim 1, wherein the processing further comprises removing a background from the captured image data and extracting a scissor cut of an image through semantic segmentation.

9. A method for monitoring an aircraft cargo bay, comprising:
receiving, by an aircraft interface device, image data from a camera in a cargo bay of an aircraft;
detecting, by the aircraft interface device, movement in the cargo bay based on the image data;
directing, by the aircraft interface device, the camera to activate, wherein the camera is configured to capture the image data of the cargo bay;
processing, by the aircraft interface device, the captured image data for event detection and event classification, including:
performing, by the aircraft interface device, image segmentation and representation;
performing, by the aircraft interface device, image extraction based on localization and segmentation techniques to generate an extracted image from the captured image data;
processing, by the aircraft interface device, the extracted image through a trained deep neural network for an object classification;
evaluating, by the aircraft interface device, a confidence of the object classification; and
receiving, by the aircraft interface device, feedback including additional images, videos, and/or scans in response to the confidence being low; and
monitoring, by the aircraft interface device, loading of cargo to prevent damage based on a cargo-loading event classification.

10. The method of claim 9, wherein the monitoring further comprises monitoring, by the aircraft interface device, movement within the aircraft cargo bay.

11. The method of claim 10, further comprising:
generating, by the aircraft interface device, a three-dimensional scan of the cargo bay, wherein the generating further comprises generating, by the aircraft interface device, a three-dimensional scan of cargo containers.

12. The method of claim 11, further comprising:
calculating, by the aircraft interface device, an area between a fuselage wall of the cargo bay and a container based on the three-dimensional scans.

13. The method of claim 12, further comprising:
comparing, by the aircraft interface device, a calculated area to a minimum separation standard; and
generating, by the aircraft interface device, an alarm based on the calculated area that is less than the minimum separation standard.

* * * * *